(12) United States Patent
Kimikawa et al.

(10) Patent No.: US 6,295,256 B1
(45) Date of Patent: Sep. 25, 2001

(54) FOCUSING BIAS ADJUSTING APPARATUS AND METHOD IN OPTICAL RECORDING MEDIUM PLAYING APPARATUS

(75) Inventors: Yuichi Kimikawa; Motoi Kimura; Hitoshi Yamazaki; Alex Bradshaw; Morio Nozaki, all of Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/577,626

(22) Filed: May 25, 2000

(30) Foreign Application Priority Data

May 31, 1999 (JP) .................................................. 11-151303

(51) Int. Cl.$^7$ ........................................................ G11B 7/00
(52) U.S. Cl. ..................... 369/44.32; 369/44.25; 369/53.19
(58) Field of Search ............................. 369/44.11, 44.23, 369/44.25, 44.27, 44.28, 44.29, 44.32, 44.33, 44.34, 44.35, 44.41, 47.1, 53.1, 53.11, 53.14, 53.19, 53.28

(56) References Cited

U.S. PATENT DOCUMENTS 5,742,575 * 4/1998 Yamakawa et al. ............... 369/53.22

FOREIGN PATENT DOCUMENTS 9-237424 A  9/1997 (JP) .
11-003531 A  1/1999 (JP) .

* cited by examiner

Primary Examiner—Muhammad Edun
(74) Attorney, Agent, or Firm—Morgan, Lewis & Bockius LLP

(57) ABSTRACT

A focusing bias adjusting apparatus in an optical recording medium playing apparatus, in which a focusing bias adjustment is executed to remove an offset component in a focusing error signal based on each output signal of a split type photodetector in an optical pickup and, thereafter, a tilt adjustment is executed to an optical system so as to maximize a read signal serving as a sum signal of the output signals of the photodetector in order to compensate a tilt angle which is defined by a normal at the irradiating position of a laser beam from the optical pickup on the recording surface of an optical recording medium and the optical axial direction of the laser beam. When the tilt adjusting operation of the optical system of the optical pickup is performed after completion of the focusing bias adjustment, the focusing bias adjustment is executed again.

11 Claims, 7 Drawing Sheets

FOCUSING BIAS ADJUSTING APPARATUS AND METHOD IN OPTICAL RECORDING MEDIUM PLAYING APPARATUS

BACKGROUND OF THE INVENTION

1. Field of the Invention

The present invention relates to focusing bias adjusting apparatus and method in an optical recording medium playing apparatus.

2. Description of the Related Art

To accurately read recording information from an optical disc such as CD (Compact Disc), DVD (Digital Versatile Disc), or the like, it is necessary to vertically irradiate a reading beam onto a recording surface of the optical disc. If a warp occurs in the optical disc itself or an error of a mechanism system is large, however, the reading beam cannot be vertically irradiated onto the recording surface of the optical disc and information reading precision deteriorates.

A recording medium playing apparatus for reproducing the recording information from the optical disc is, therefore, provided with a tilt servo control apparatus for detecting a tilt occurring between a pickup as information reading means and the optical disc, inclining the whole pickup by an angle corresponding to the detected tilt, or performing a tilt correcting process corresponding to the tilt to a read signal read out by the pickup, thereby suppressing the deterioration of the information reading precision.

As a tilt servo control apparatus, an apparatus using a liquid crystal panel inserted onto an optical axis in order to execute the tilt correction is known (for example, JP-A-11-3531). In the case of the apparatus, the liquid crystal panel is divided into a plurality of regions and a phase difference is given to a laser beam passing through each region of the liquid crystal panel so as to maximize a level of the read signal derived by the pickup.

Since the irradiation laser beam needs to be focused onto the recording surface of the optical disc in order to accurately read the recording information from the optical disc, an optical disc player is provided with a focusing servo control apparatus for generating a focusing error signal on the basis of each photodetecting level of a plurality of split photodetectors of the pickup and controlling a position in the optical axial direction of an objective lens so as to reduce a level of the focusing error signal. In the focusing servo control apparatus, generally, the focusing error signal is not set to a reference level (for example, 0) in an in-focus state because of an error of an optical system but includes a DC component as an offset component in the focusing error signal. A focusing bias adjustment, therefore, for forcibly setting the offset component in the focusing error signal to 0 is executed so that the focusing error signal is set to the reference level in the in-focus state.

The focusing bias adjustment is generally executed as an initial operation just after the optical disc was set to the disc player. Since the tilt servo control operation is performed by the tilt servo control apparatus even during the playback of the disc, however, if the tilt correction is executed by the tilt servo control operation, since the focusing bias adjustment executed as an initial operation is based on the photodetecting level of each photodetector of the pickup before the tilt correction is executed, there is such a problem that an adjustment value is deviated from a true adjustment value as a result and is not proper. The problem also similarly occurs in the case where an apparatus in which an optical device other than the liquid crystal panel is inserted into the optical system of the pickup so as to maximize the level of the read signal derived by the pickup is used as a tilt servo control apparatus.

OBJECTS AND SUMMARY OF THE INVENTION

It is, therefore, an object of the present invention to provide focusing bias adjusting apparatus and method in an optical recording medium playing apparatus, in which a proper focusing bias adjustment result can be obtained even when a tilt occurs between a pickup and an optical recording medium such as an optical disc or the like.

According to the invention, there is provided a focusing bias adjusting apparatus in an optical recording medium playing apparatus, comprising: an optical pickup having an optical system for irradiating a laser beam onto an optical recording medium and detecting light reflected from the optical recording medium by a split type photodetector; focusing servo control means for generating a focusing error signal on the basis of each output signal of the photodetector and moving an objective lens in the pickup in an optical axial direction of the laser beam in accordance with the focusing error signal; focusing bias adjusting means for making a focusing bias adjustment in order to remove an offset component in the focusing error signal; tilt servo control means for adjusting the optical system so as to maximize a read signal as a sum signal of each output signal of the photodetector in order to compensate a tilt angle which is defined by a normal at the irradiating position of the laser beam on a recording surface of the optical recording medium and the optical axial direction of the laser beam; and readjustment control means for controlling the focusing bias adjusting means so as to execute the focusing bias adjustment again when the adjusting operation of the optical system is performed by the tilt servo control means after completion of the focusing bias adjustment by the focusing bias adjusting means.

According to the invention, there is also provided a focusing bias adjusting apparatus in an optical recording medium playing apparatus, comprising: an optical pickup having an optical system for irradiating a laser beam onto an optical recording medium and detecting light reflected from the optical recording medium by a split type photodetector; focusing servo control means for generating a focusing error signal on the basis of each output signal of the photodetector and moving an objective lens in the pickup in an optical axial direction of the laser beam in accordance with the focusing error signal; focusing bias adjusting means for making a focusing bias adjustment in order to remove an offset component in the focusing error signal; tilt servo control means for adjusting the optical system so as to maximize a read signal as a sum signal of each output signal of the photodetector in order to compensate a tilt angle which is defined by a normal at the irradiating position of the laser beam on a recording surface of the optical recording medium and the optical axial direction of the laser beam; discriminating means for discriminating whether a starting condition of the focusing bias adjustment is satisfied or not when the tilt servo control means executes the adjusting operation of the optical system after completion of the focusing bias adjustment by the focusing bias adjusting means; and readjustment control means for controlling the focusing bias adjusting means so as to executing the focusing bias adjustment again when the discriminating means determines that the starting condition of the focusing bias adjustment is satisfied.

According to the invention, there is further provided a focusing bias adjusting method in an optical recording medium playing apparatus, comprising the steps of: making a focusing bias adjustment to remove an offset component in a focusing error signal based on each output signal of a split type photodetector in an optical pickup; and thereafter, making a tilt adjustment of the optical system so as to maximize a read signal as a sum signal of each output signal of the photodetector in order to compensate a tilt angle which is defined by a normal at the irradiating position of a laser beam from the optical pickup on a recording surface of the optical recording medium and an optical axial direction of the laser beam, wherein the focusing bias adjustment is executed again when a tilt adjusting operation of the optical system of the optical pickup is performed after completion of the focusing bias adjustment.

According to the invention, there is further provided a focusing bias adjusting method in an optical recording medium playing apparatus, comprising the steps of: making a focusing bias adjustment to remove an offset component in a focusing error signal based on each output signal of a split type photodetector in an optical pickup; and thereafter, making a tilt adjustment of the optical system so as to maximize a read signal as a sum signal of each output signal of the photodetector in order to compensate a tilt angle which is defined by a normal at the irradiating position of a laser beam from the optical pickup on a recording surface of an optical recording medium and an optical axial direction of the laser beam, wherein when the tilt adjusting operation of the optical system of the optical pickup is performed after completion of the focusing bias adjustment, whether a starting condition of the focusing bias adjustment is satisfied or not is discriminated, and when it is determined that the starting condition of the focusing bias adjustment is satisfied, the focusing bias adjustment is executed again.

DETAILED DESCRIPTION OF THE PREFERRED EMBODIMENTS

Embodiments of the invention will now be described in detail hereinbelow with reference to the drawings.

Figure 1:
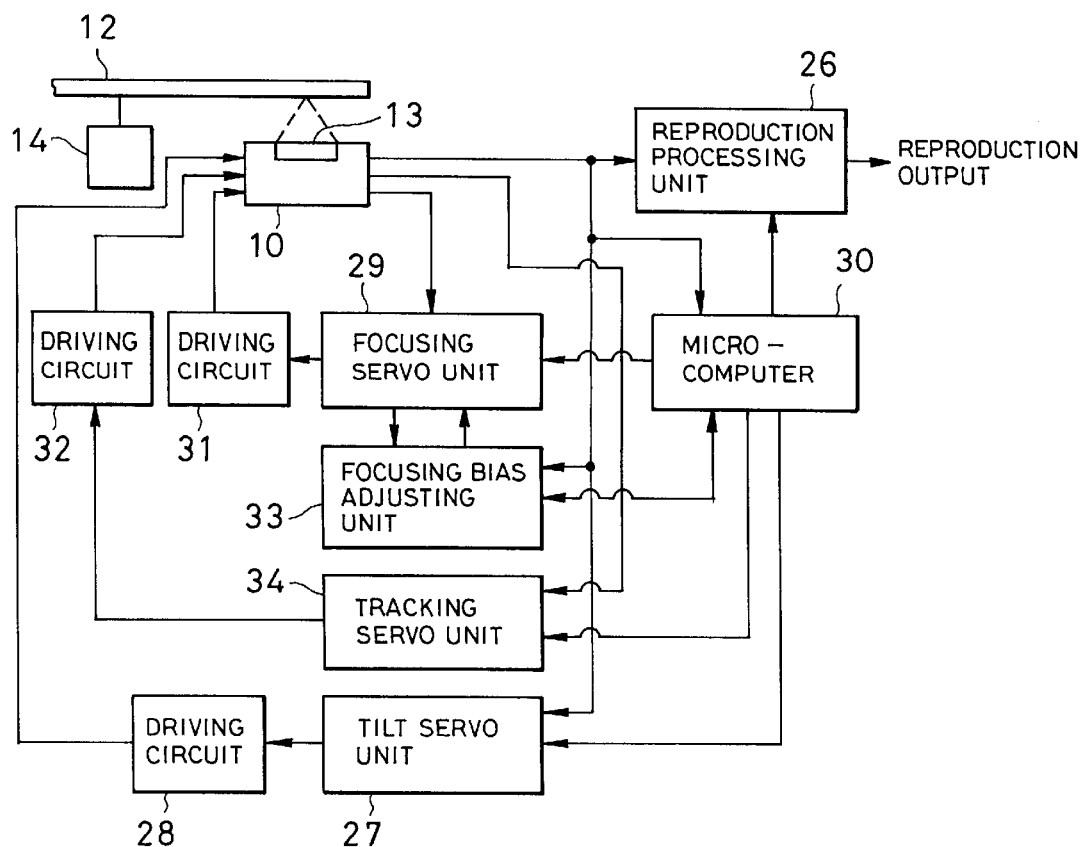
FIG. 1 is a block diagram showing an optical disc player to which focusing bias adjusting apparatus and method according to the invention are applied.

FIG. 1 shows an optical disc player to which focusing bias adjusting apparatus and method according to the invention are applied. In the optical disc player, a pickup 10 irradiates a laser beam onto an optical disc 12, receives light reflected from the optical disc 12, and generates a signal according to a light reception amount. The optical disc 12 is rotated by a motor 14.

Figure 2:
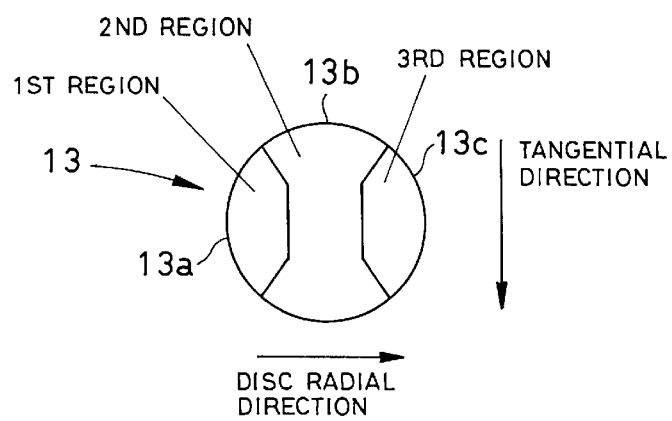
FIG. 2 is a diagram showing each region of a liquid crystal panel.

In the pickup 10, a liquid crystal panel 13 for correcting an aberration in the disc radial direction is arranged on the optical axis of the laser beam, thereby enabling a wavefront aberration of the optical system to be corrected. The liquid crystal panel 13 is divided into, for example, three regions 13a to 13c on the inner rim portion, intermediate portion, and outer rim portion in the radial direction as shown in FIG. 2. The three regions 13a to 13c are variably controlled for each of the regions 13a to 13c by an individual driving voltage that is generated from a tilt servo unit 27, which will be explained hereinlater. Since a phase difference of the light passing through each of the regions 13a to 13c can be changed individually, therefore, a wavefront aberration such as a coma aberration or the like which is caused by a tilt occurring in the disc radial direction can be corrected.

Figure 3:
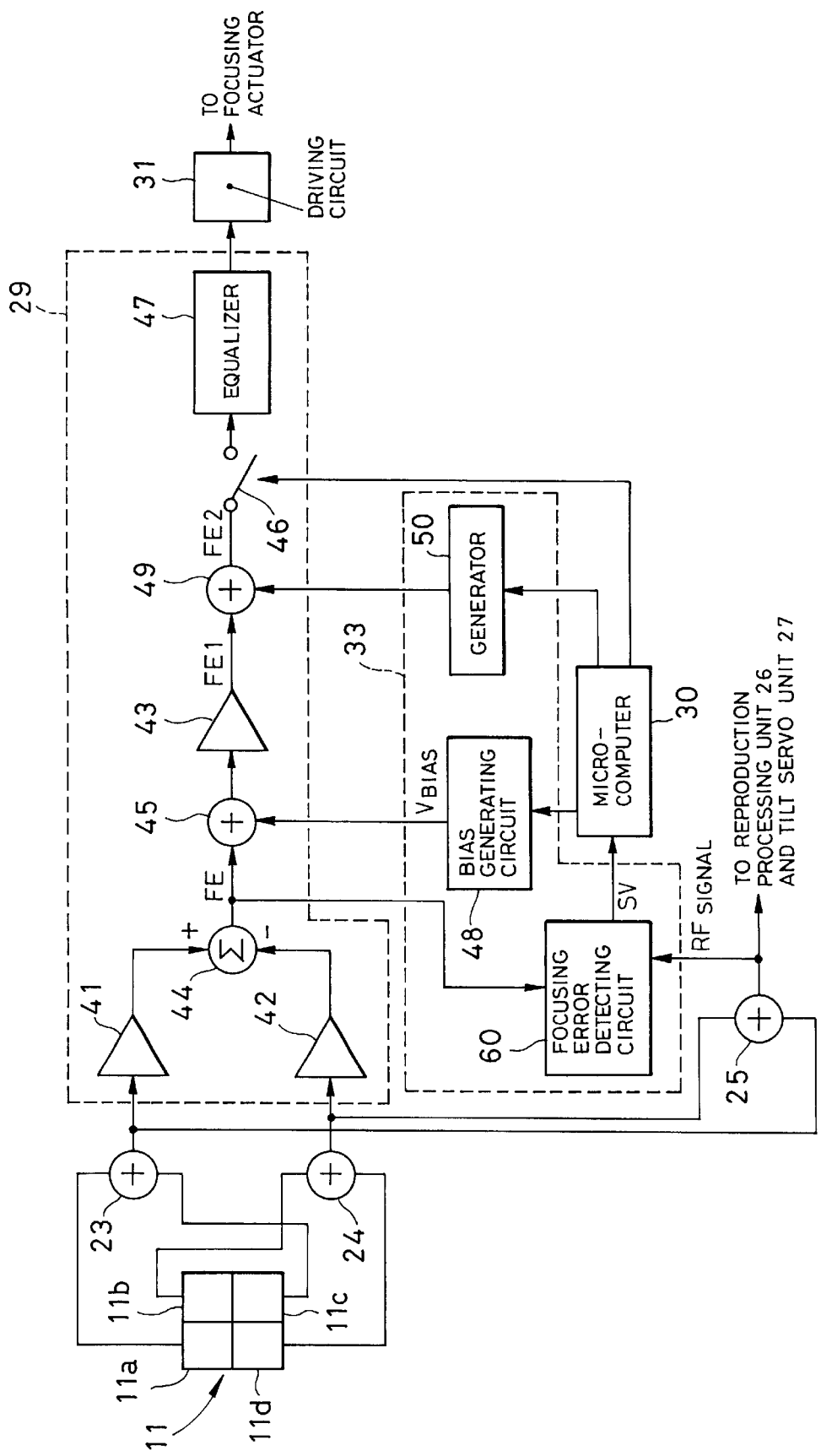
FIG. 3 is a block diagram showing a focusing servo unit.

As shown in FIG. 3, the pickup 10 has a 4-split photodetector 11 comprising four photodetecting devices 11a to 11d. Output signals of the photodetecting devices 11a to 11d of the photodetector 11 are assumed to be a, b, c, and d, respectively. Sum signals (a+c) and (b+d) of the output signals of the respective two photodetecting devices arranged at symmetrical positions where a cross point of two dividing lines of photosensing surfaces of the photodetecting devices 11a to 11d is set to a center are calculated by adders 23 and 24, respectively. An adder 25 is connected to outputs of the adders 23 and 24. A sum (a+b+c'd) of the output signals of the photodetecting devices 11a to 11d is obtained as an RF signal (read signal) by the adder 25.

A reproduction processing unit 26, the tilt servo unit 27, and a focusing bias adjusting unit 33 are connected to an output of the adder 25. In the reproduction processing unit 26, information recorded on the optical disc 12 is reproduced in accordance with the RF signal. In the tilt servo unit 27, the driving voltage corresponding to each of the regions 13a to 13c of the liquid crystal panel 13 is generated to a driving circuit 28 so as to maximize the level of the RF signal. The driving circuit 28 individually drives the regions 13a to 13c in accordance with each driving voltage.

Figure 4:
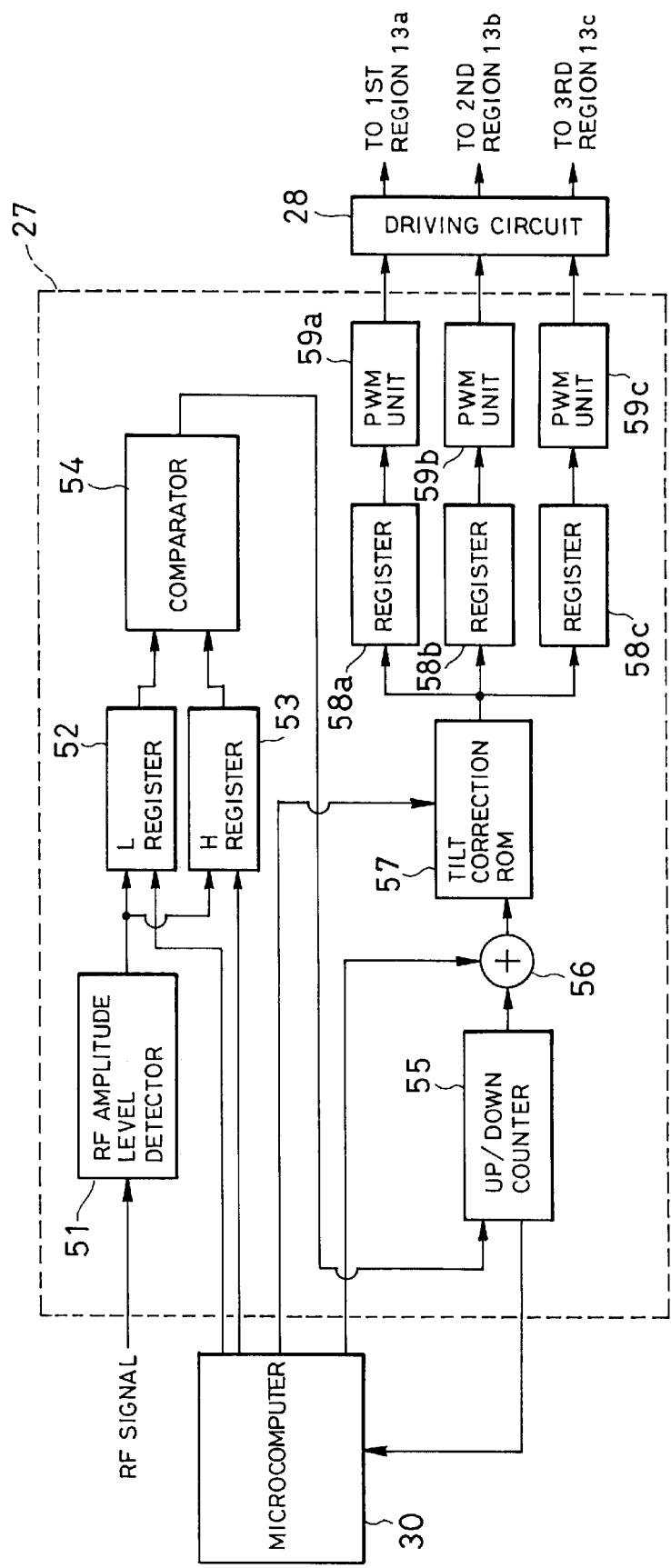
FIG. 4 is a block diagram showing a tilt servo unit.

As shown in FIG. 4, the tilt servo unit 27 comprises: an RF amplitude level detector 51; an L register 52; an H register 53; a comparator 54; an up/down counter 55; an adder 56; a tilt correction ROM 57; registers 58a to 58c; and PWM (pulse width modulation) units 59a to 59c. A construction and the operation of the tilt servo unit 27 have already been disclosed in JP-A11-3531.

As shown in FIG. 3, the focusing bias adjusting unit 33 comprises a bias generating circuit 48, a generator 50, and a focusing error detecting circuit 60. The bias generating circuit 48, generator 50, and focusing error detecting circuit 60 will be explained hereinlater.

A focusing servo unit 29 for deviating an objective lens (not shown) in the pickup 10 in the optical axial direction in order to focus the irradiation laser beam onto the recording surface of the optical disc 12 is connected to the outputs of the adders 23 and 24.

As shown in FIG. 3, the focusing servo unit 29 comprises amplifiers 41 to 43, a subtractor 44, adders 45 and 49, a switch 46, and an equalizer 47. The amplifier 41 is connected to the output of the adder 23, amplifies the output signal of the adder 23, and supplies it to a positive input of the subtractor 44. The amplifier 42 is connected to the output of the adder 24, amplifies the output signal of the adder 24, and supplies it to a negative input of the subtractor 44. The subtractor 44 subtracts the output signal level of the amplifier 42 from the output signal level of the amplifier 41 and generates a focusing error signal FE. The adder 45 and the focusing error detecting circuit 60 of the focusing bias adjusting unit 33 are connected to an output of the subtractor 44. An output of the bias generating circuit 48 is also connected to the adder 45. An output signal of the bias generating circuit 48 is added to an output signal of the subtractor 44 by the adder 45.

The bias generating circuit 48 supplies a bias voltage Vbias to the adder 45 in order to remove a DC (direct current) offset component Voffset included in the output signal FE of the subtractor 44. The generation of the bias voltage Vbias is instructed by a microcomputer 30.

An output signal of the adder 45 is supplied as a first focusing error signal FE1 to an adder 49 via the amplifier 43. The generator 50 is connected to the adder 49.

The generator 50 generates a disturbance signal (for example, sine wave signal of a frequency 1 kHz) to be multiplexed to the first focusing error signal FE1 in response to an instruction of the microcomputer 30 and supplies it to the adder 49.

The adder 49 adds the disturbance signal to the output signal of the amplifier 43 and generates the resultant signal when the disturbance signal is supplied from the generator 50. The adder 49 relays the output signal of the amplifier 43 as it is when the disturbance signal is not supplied. An output signal of the adder 49 is supplied as a second focusing error signal FE2 to the equalizer 47 through the switch 46. The switch 46 is an on/off switch which is turned on by the microcomputer 30 during the focusing servo control including the focusing bias adjustment. The equalizer 47 performs a phase compensating process to the supplied second focusing error signal FE2 and supplies the second focusing error signal FE2 after the phase compensation to a driving circuit 31. The driving circuit 31 moves the objective lens in the optical axial direction by driving a focusing actuator (not shown) in the pickup 10 in accordance with an output signal of the equalizer 47.

The focusing error detecting circuit 60 detects an error amount of a focal position of the laser beam from the information recording surface on the basis of the RF signal which is generated from the adder 25 and the focusing error signal FE that is generated from the subtractor 44 and generates an error signal SV corresponding to the error amount.

The output signals of the photodetecting devices 11a to 11d are connected to a tracking servo unit 34. The tracking servo unit 34 makes a control to move the objective lens in the disc radial direction so that the laser beam irradiates the center of the track of the recording surface of the optical disc 12. The tracking servo unit 34, therefore, generates a tracking error signal in accordance with the output signals of the photodetecting devices 11a to 11d and generates a tracking drive signal to a driving circuit 32 so as to reduce the tracking error signal. The driving circuit 32 moves the objective lens in the disc radial direction by driving a tracking actuator (not shown) in the pickup 10 in accordance with the tracking drive signal.

Besides the control of the operation of each of the bias generating circuit 48 and generator 50 in the focusing bias adjusting unit 33, the operation of each of the reproduction processing unit 26, tilt servo unit 27, focusing servo unit 29, and tracking servo unit 34 is controlled by the microcomputer 30.

The operation of the microcomputer 30 will now be described.

Figure 5:
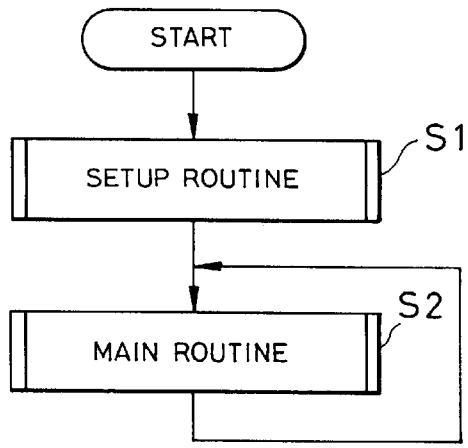
FIG. 5 is a flowchart showing the operation of a microcomputer.

As shown in FIG. 5, the microcomputer 30 executes a process of the setup routine (step S1) only once when the optical disc 12 is set to the player and, thereafter, repetitively executes the processes in a main routine (step S2).

Figure 6:
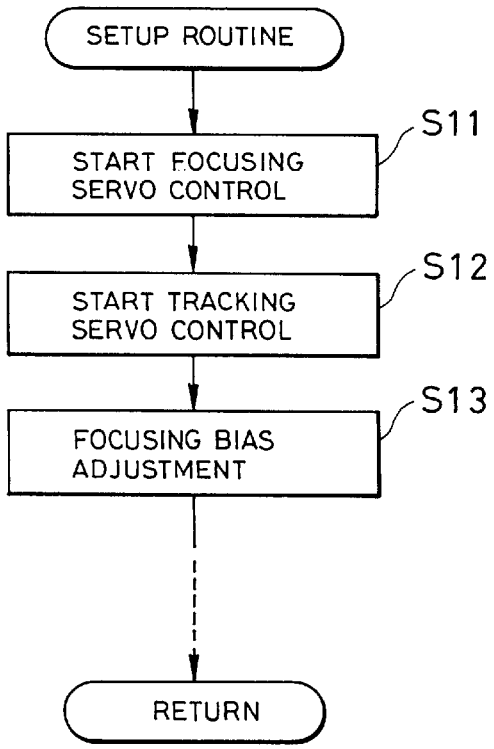
FIG. 6 is a flowchart showing a setup routine.

In the setup routine, as shown in FIG. 6, the microcomputer 30 starts the focusing servo control by the focusing servo unit 29 (step S11) and, thereafter, starts the tracking servo control by the tracking servo unit 34 (step S12) When the focusing servo control is started, the switch 46 in the focusing servo unit 29 is turned on.

The microcomputer 30 executes the focusing bias adjustment (step S13) after the start of the focusing servo control and the tracking servo control. In the focusing bias adjustment, first, the generator 50 is made operative and the disturbance signal is supplied from the generator 50 to the adder 49. After that, the microcomputer 30 waits for the stabilization of the error signal SV which is generated from the focusing error detecting circuit 60 and subsequently measures the error signal SV. At the time, the error signal SV indicates an error voltage corresponding to an error amount between the focal position of the laser beam at the sampling position on the optical disc 12 and the information recording surface of the optical disc 12. By repetitively sampling the error voltage by a predetermined number of times, a maximum value $V_{MAX}$ and a minimum value $V_{MIN}$ of the error voltage are obtained. An average value $(V_{MAX}+V_{MIN})/2$ is calculated from the maximum value $V_{MAX}$ and minimum value $V_{MIN}$. The average value is set to a final error voltage V. An adjustment amount $\Delta=(V/a)\times g$ of the bias voltage Vbias is calculated by using the error voltage V. (a) denotes a coefficient showing the relation between the error amount from the position on the information recording surface of the focal position of the laser beam and the error voltage V. (g) indicates a value showing the sensitivity of the focusing error signal FE at a focal point. When the adjustment amount $\Delta$ is obtained, the adjustment amount $\Delta$ is added to the bias voltage Vbias so far, thereby calculating the bias voltage Vbias of a new level. In the case of making the focusing bias adjustment in step S13, the bias voltage Vbias so far is set to an initial value. The generation of the bias voltage Vbias calculated in this manner is instructed to the bias generating circuit 48. In response to the instruction, the bias generating circuit 48 supplies the bias voltage Vbias at the newly calculated level to the adder 45. The adder 45 adds the bias voltage Vbias to the output signal of the subtractor 44 and supplies a resultant signal to the amplifier 43. The offset component Voffset included in the output signal FE of the subtractor 44 is, thus, canceled. When the focusing bias adjustment is executed in this manner, the generation of the disturbance signal by the generator 50 is stopped. The details of the focusing bias adjustment has been disclosed in JP-A-9-237424. In step S13, the focusing bias adjustment is executed a plurality of number of times.

Figure 7:
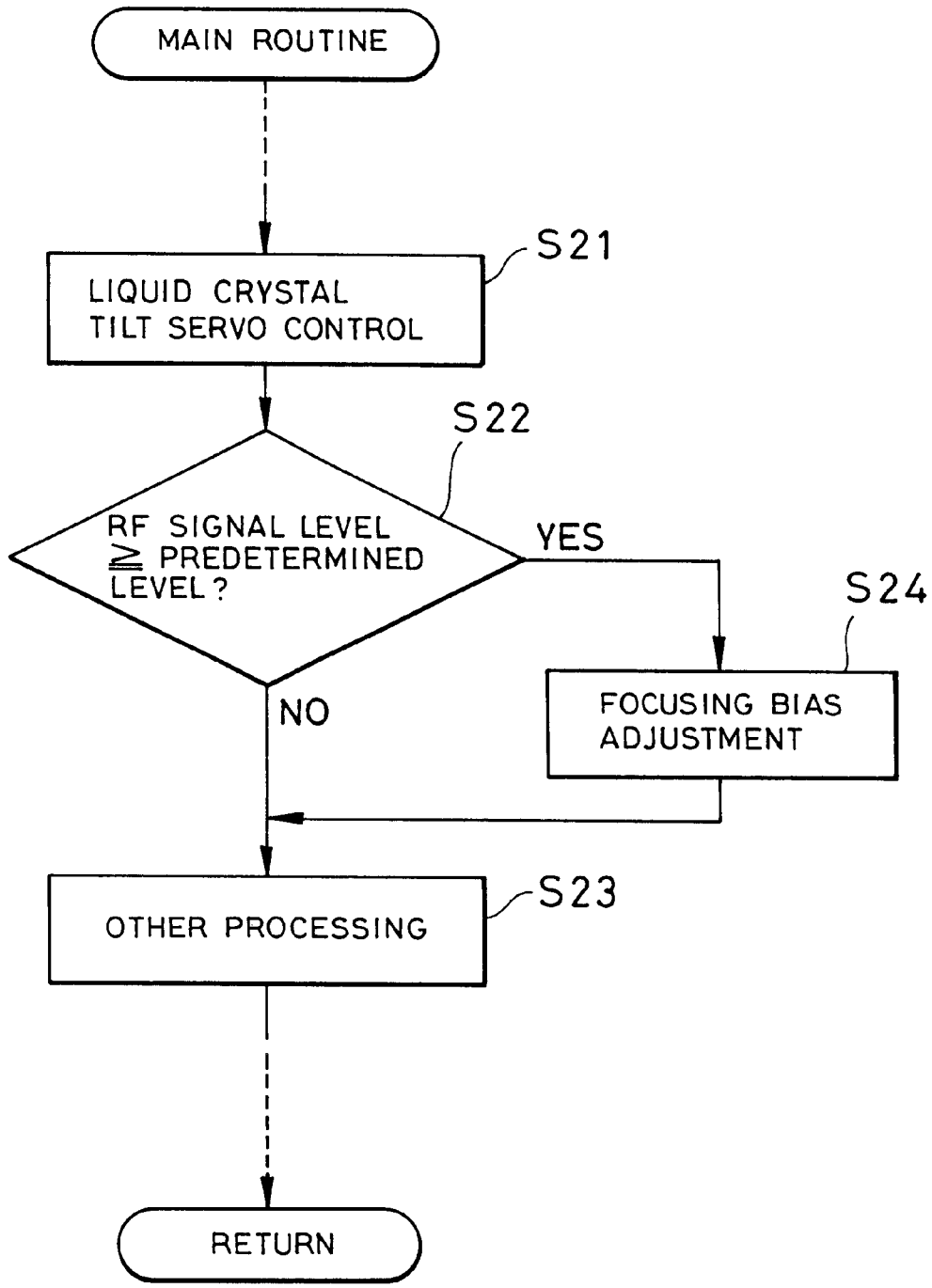
FIG. 7 is a flowchart showing a main routine.

In the main routine, as shown in FIG. 7, a liquid crystal tilt servo control is executed (step S21). In the liquid crystal tilt servo control, a new drive signal corresponding to each of the regions 13a to 13c of the liquid crystal panel 13 is supplied to the driving circuit 28 so as to maximize the RF signal level.

The control operation will now be described with reference to a construction of the tilt servo unit 27 in FIG. 4. The microcomputer 30 first allows a present count value of the up/down counter 55 at that time to be supplied to the tilt correction ROM 57 via the adder 56, allows a liquid crystal drive amount of each of the regions 13a to 13c to be read out from an address in the tilt correction ROM 57 designated by the supplied count value and held in each of the corresponding registers 58a to 58c. The liquid crystal drive amount of each of the regions 13a to 13c of the corresponding liquid crystal panel 13 at every predetermined tilt angle (for example, 1°) has previously been written in the tilt correction ROM 57. In the first main routine after the setup routine process, since the count value of the up/down counter 55 is set to an initial value, the liquid crystal drive amount of each of the regions 13a to 13c corresponding to an initial angle (for example, 0°) of the tilt angle is read out. When the new liquid crystal drive amounts are held in the registers 58a to 58c, a drive signal of a pulse width corresponding to the new liquid crystal drive amount is generated by each of the PWM units 59a to 59c. The driving circuit 28 individually applies a voltage to each of the regions 13a to 13c in accordance with the level of each drive signal. As a result of applying the voltages, an optical path difference $\Delta n \cdot d$ ($\Delta n$ denotes a change amount of a refractive index, d indicates a cell thickness of liquid crystal) is given due to a birefringence effect of liquid crystal molecules of the regions 13a to 13c. That is, when a wavelength of laser beam passing through the liquid crystal is represented by $\lambda$, a phase difference $\Delta n \cdot d$ $(2\pi/\lambda)$ can be given to the laser beam.

The microcomputer 30 further allows the amplitude detection value of the RF signal obtained by giving the phase difference to be held in the L register 52, allows the adder 56 to add "1" to the present count value of the up/down counter 55, and allows the liquid crystal drive amount of each of the regions 13a to 13c to be read out from the address in the tilt correction ROM 57 designated by the output value of the adder 56 and held in the corresponding registers 58a to 58c, respectively. The drive signal of the pulse width corresponding to the liquid crystal drive amount which was newly held is generated by each of the PWM units 59a to 59c. The driving circuit 28 individually applies the voltage to the regions 13a to 13c in accordance with each drive signal level. The microcomputer 30, therefore, allows the amplitude detection value of the RF signal derived by further giving the phase difference to the laser beam to be held in the H register 53. A comparison result of the two amplitude values held in the L register 52 and H register 53 is obtained in the comparator 54. Thus, if the amplitude value held in the register 52 is larger than the amplitude value held in the H register 53, the count value of the up/down counter 55 is decreased by "1". If the amplitude value held in the H register 53 is larger than the amplitude value held in the L register 52, the count value of the up/down counter 55 is increased by "1". If the amplitude value held in the L register 52 is equal to the amplitude value held in the H register 53, the present count value of the up/down counter 55 is maintained.

When the value of the up/down counter 55 is set as mentioned above, the liquid crystal tilt servo control operation in step S21 is once finished. Since the main routine is repetitively processed as mentioned above, the control operation is again executed when the main routine is subsequently processed.

After the execution of step S21, the microcomputer 30 discriminates whether the RF signal level, namely, the amplitude value is equal to or higher than a predetermined level or not (step S22). Step S22 relates to a discriminating process for discriminating whether it is necessary to execute the focusing bias adjustment again due to the change in an amount of the offset component Voffset because the RF signal level has been corrected by the liquid crystal tilt servo control in step S21 or not. When the RF signal level is lower than a predetermined level, it is regarded that the amount of offset component Voffset is not changed by the liquid crystal tilt servo control, so that the processing routine advances to other processing in step S23. When the RF signal level is equal to or higher than the predetermined level, there is a possibility that the amount of offset component Voffset has been changed by the liquid crystal tilt servo control, so that the focusing bias adjustment is executed (step S24). In the focusing bias adjustment, the same operation as the focusing bias adjustment in step S13 is executed, thereby compensating the change in the amount of the offset component Voffset due to the liquid crystal tilt servo control. After the execution of step S24, step S23 is executed.

In another processing in step S23, for example, the control of the reproduction processing unit 26 is executed.

Figure 8:
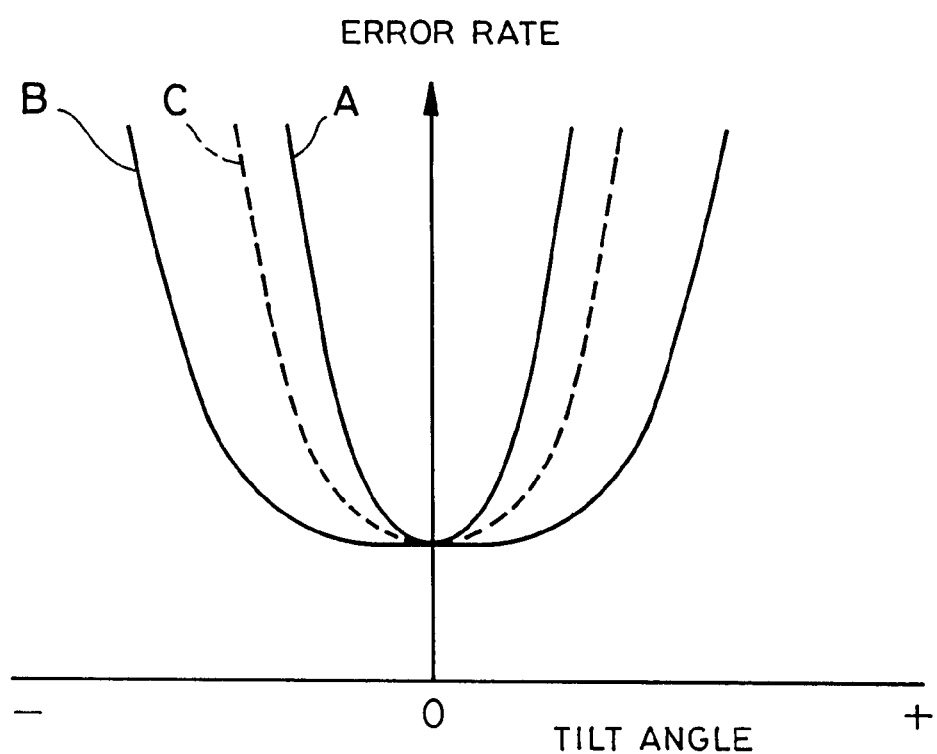
FIG. 8 is a diagram showing the relation between a tilt angle and an error rate.

In the case of playing the disc in a state where a tilt occurs between the pickup 10 and optical disc 12, reading error rate characteristics for the tilt angle become as shown by a solid line A in FIG. 6. In step S11 of the setup routine, however, after the bias generating circuit 48 performed the focusing bias adjustment to generate the level of the bias voltage Vbias so as to cancel the offset component Voffset, the tilt correction is executed by the liquid crystal tilt servo control in step S21 of the main routine and, further, the focusing bias adjustment is executed again in step S24, so that the reading error rate characteristics for the tilt angle are improved as shown by a solid line B in FIG. 8. The reading error rate can be suppressed even for a relatively large tilt angle. When the focusing bias adjustment is not executed again, the reading error rate characteristics for the tilt angle are improved as shown by a broken line C in FIG. 8. It will, therefore, be understood from those characteristics that by executing the focusing bias adjustment again, the tilt margin increases and the deterioration of the reading error rate can be prevented when a tilt further occurs during the playback.

In place of the discrimination about whether the RF signal is equal to or higher than the predetermined level or not in step S22, the RF signal level at the start of the first main routine after completion of the setup routine process is set to an initial value and whether a change width of the present RF signal level from the initial value is equal to or larger than a first predetermined width or not can be also discriminated. When the change width of the present RF signal level from the initial value is equal to or larger than a first predetermined width, it is regarded that there is a possibility that the amount of offset component Voffset has been changed by the liquid crystal tilt servo control, so that step S24 follows and the focusing bias adjustment is executed. In step S22, whether a change width of the RF signal level up to the timing of a plurality of times before the present time lies within a third change width or not can be discriminated. In the case of this discrimination, it is regarded that the level of the RF signal itself is not changed because the tilt has been corrected so as to maximize the RF signal level by the liquid crystal tilt servo control, so that step S24 follows and the focusing bias adjustment is executed. Further, in step S22, it is also possible to discriminate whether a predetermined time has elapsed after the liquid crystal tilt servo control was executed in the first main routine after completion of the setup routine process or not. In the case of this discrimination, at most the elapse of the predetermined time is necessary in order to correct the tilt so that the RF signal level becomes maximum by the liquid crystal tilt servo control. It is, therefore, regarded that the level of the RF signal itself is not changed after the elapse of the predetermined time, so that step S24 follows and the focusing bias adjustment is executed. In step S22, the above discriminating steps can be also combined. For example, the processing routine advances to step S24 when either a discrimination result indicating that the change width of the RF signal level up to the timing of a plurality of number of times before the present time lies within the third predetermined width or a discriminating result indicating that the predetermined time has elapsed after the liquid crystal tilt servo control was executed in the first main routine after completion of the setup routine process.

In place of the discrimination about whether the RF signal level is equal to or higher than the predetermined level or not in step S22, it is also possible to discriminate whether the tilt adjustment value by the liquid crystal tilt servo control, for example, the count value of the up/down counter 55 is equal to or higher than a second predetermined level or not. Further, whether a change amount of the tilt adjustment value by the liquid crystal tilt servo control, for example, a change amount of the count value of the up/down counter 55 is equal to or larger than a second predetermined width or not can be also discriminated.

In the foregoing embodiment, when it is determined in step S22 that the focusing bias adjustment is necessary during the disc playback, the focusing bias adjustment is always executed again. It is also possible, however, to construct in such a manner that the re-execution of the focusing bias adjustment is not executed a predetermined number of times (for example, 2 times) or more. It is also possible to use a method whereby during the disc playback, each time the information reading position of the disc exists at each of the inside position, the intermediate position, and the outside position, whether the focusing bias adjustment needs to be executed again or not is discriminated in step S22, and if it is necessary, the focusing bias adjustment is executed again in step S24.

Figure 9:
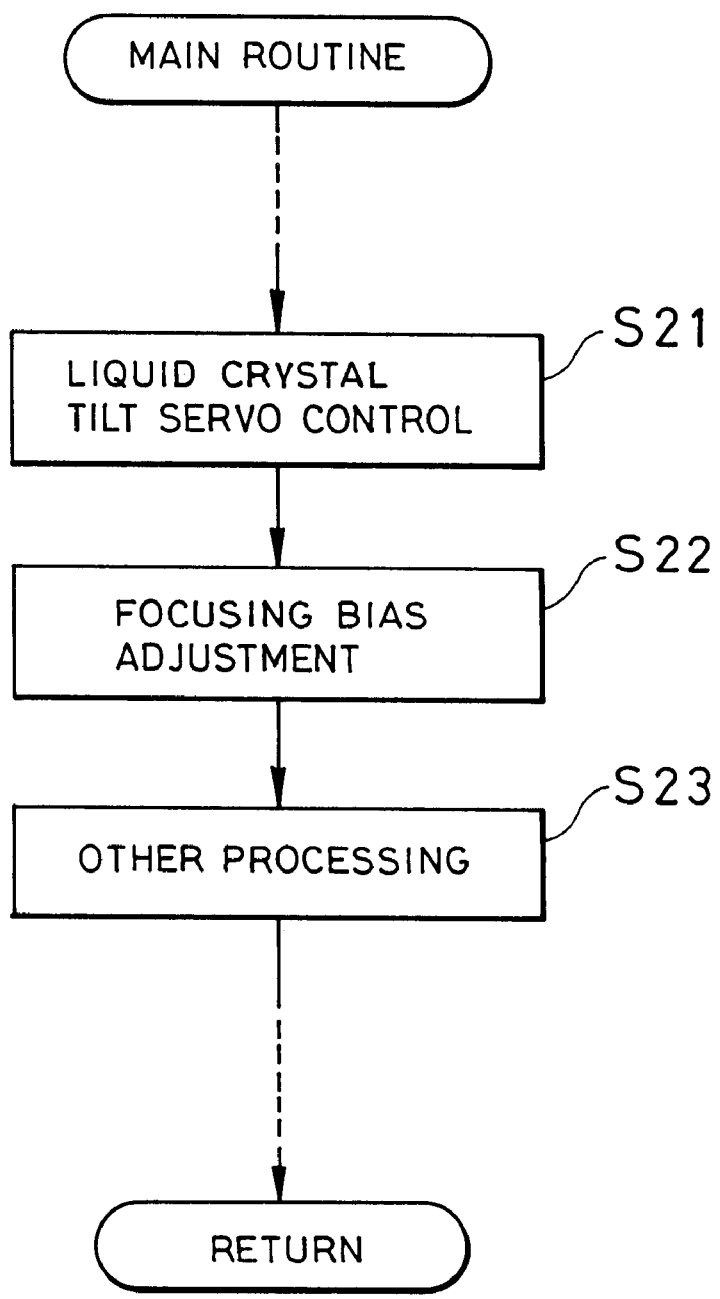
FIG. 9 is a flowchart showing a main routine-according to another embodiment.

In the embodiment, after the liquid crystal tilt servo control was executed in step S21, only when the re-execution of the focusing bias adjustment is determined to be necessary in step S22, step S24 follows and the focusing bias adjustment is executed again. As shown in FIG. 9, however, after the liquid crystal tilt servo control was executed, the processing routine immediately advances to step S24 and the focusing bias adjustment can be executed again.

Further, although the focusing bias adjustment is executed by setting the level of the output bias voltage Vbias of the bias generating circuit 48 in steps S13 and S24, in place of it, a focusing balance adjustment for removing the offset component that is caused in the output of the amplifier 43 can be also executed by adjusting each gain of the amplifiers 41 and 42. In the focusing balance adjustment, there is no need to add the bias voltage Vbias to the focusing error signal FE of the output signal of the subtractor 44 but the output signal of the subtractor 44 can be also supplied as it is to the amplifier 43.

Although the case of using the optical disc as an optical recording medium has been shown in the embodiment, the optical recording medium is not limited to the optical disc but another optical recording medium such as an optical card or the like can be used.

As mentioned above, according to the invention, the focusing bias adjustment is executed again after the tilt servo control was executed. Therefore, even if the tilt occurred between the pickup and the optical recording medium, the proper focusing bias adjustment result can be obtained at the time of playback of the optical recording medium.

What is claimed is:

1. A focusing bias adjusting apparatus in an optical recording medium playing apparatus, comprising:

an optical pickup having an optical system for irradiating a laser beam onto an optical recording medium and detecting light reflected from said optical recording medium by a split type photodetector;

focusing servo control means for generating a focusing error signal on the basis of each output signal of said photodetector and moving an objective lens in said pickup in an optical axial direction of said laser beam in accordance with said focusing error signal;

focusing bias adjusting means for making a focusing bias adjustment in order to remove an offset component in said focusing error signal;

tilt servo control means for adjusting said optical system so as to maximize a read signal as a sum signal of each output signal of said photodetector in order to compensate a tilt angle which is defined by a normal at the irradiating position of said laser beam on a recording surface of said optical recording medium and the optical axial direction of said laser beam; and readjustment control means for controlling said focusing bias adjusting means so as to execute said focusing bias adjustment again when the adjusting operation of said optical system is performed by said tilt servo control means after completion of said focusing bias adjustment by said focusing bias adjusting means.

2. An apparatus according to claim 1, wherein said tilt servo control means has a split type liquid crystal panel inserted in said optical system and individually drives each dividing region of said liquid crystal panel so as to maximize the read signal as said sum signal of each output signal of said photodetector.

3. A focusing bias adjusting apparatus in an optical recording medium playing apparatus, comprising:

an optical pickup having an optical system for irradiating a laser beam onto an optical recording medium and detecting light reflected from said optical recording medium by a split type photodetector;

focusing servo control means for generating a focusing error signal on the basis of each output signal of said photodetector and moving an objective lens in said pickup in an optical axial direction of said laser beam in accordance with said focusing error signal;

focusing bias adjusting means for making a focusing bias adjustment in order to remove an offset component in said focusing error signal;

tilt servo control means for adjusting said optical system so as to maximize a read signal as a sum signal of each output signal of said photodetector in order to compensate a tilt angle which is defined by a normal at the irradiating position of said laser beam on a recording surface of said optical recording medium and the optical axial direction of said laser beam;

discriminating means for discriminating whether a starting condition of said focusing bias adjustment is satisfied or not when said tilt servo control means executes the adjusting operation of said optical system after completion of said focusing bias adjustment by said focusing bias adjusting means; and readjustment control means for controlling said focusing bias adjusting means so as to execute said focusing bias adjustment again when said discriminating means determines that the starting condition of said focusing bias adjustment is satisfied.

4. An apparatus according to claim 3, wherein said starting condition of said focusing bias adjustment is a case where said read signal level is higher than a first predetermined level.

5. An apparatus according to claim 3, wherein said starting condition of said focusing bias adjustment is a case where a level fluctuation width of said read signal becomes larger than a first predetermined width due to the adjusting operation of said optical system by said tilt servo control means.

6. An apparatus according to claim 3, wherein said starting condition of said focusing bias adjustment is a case where an adjusting level of said optical system by said tilt servo control means is higher than a second predetermined level.

7. An apparatus according to claim 3, wherein said starting condition of said focusing bias adjustment is a case where an adjusting level fluctuation width of said optical system by said tilt servo control means becomes larger than a second predetermined width.

8. An apparatus according to claim 3, wherein said starting condition of said focusing bias adjustment is a case where a state where a level fluctuation width of said read signal of the adjusting operation of said optical system by said tilt servo control means is smaller than a third predetermined width continues a predetermined number of times.

9. An apparatus according to claim 3, wherein said starting condition of said focusing bias adjustment is a case where a predetermined time has elapsed after the adjusting operation of said optical system by said tilt servo control means was started.

10. A focusing bias adjusting method in an optical recording medium playing apparatus, comprising the steps of;

making a focusing bias adjustment to remove an offset component in a focusing error signal based on each output signal of a split type photodetector in an optical pickup; and thereafter, making a tilt adjustment of an optical system so as to maximize a read signal as a sum signal of each output signal of said photodetector in order to compensate a tilt angle which is defined by a normal at an irradiating position of a laser beam from said optical pickup on a recording surface of an optical recording medium and an optical axial direction of said laser beam, wherein said focusing bias adjustment is executed again when the tilt adjusting operation of the optical system of said optical pickup is performed after completion of the focusing bias adjustment.

11. A focusing bias adjusting method in an optical recording medium playing apparatus, comprising the steps of:

making a focusing bias adjustment to remove an offset component in a focusing error signal based on each output signal of a split type photodetector in an optical pickup; and thereafter, making a tilt adjustment of an optical system so as to maximize a read signal as a sum signal of each output signal of said photodetector in order to compensate a tilt angle which is defined by a normal at an irradiating position of a laser beam from said optical pickup on a recording surface of an optical recording medium and an optical axial direction of said laser beam, wherein when the tilt adjusting operation of the optical system of said optical pickup is performed after completion of said focusing bias adjustment, whether a starting condition of said focusing bias adjustment is satisfied or not is discriminated, and when it is determined that said starting condition of said focusing bias adjustment is satisfied, said focusing bias adjustment is executed again.

* * * * *